Patented May 10, 1949

2,469,512

UNITED STATES PATENT OFFICE 2,469,512

SILICEOUS MAGNESIUM-CONTAINING PURIFYING MEDIUM AND PROCESS OF PRODUCING IT

John J. Naugle, New York, N. Y.

No Drawing. Application January 18, 1947,
Serial No. 722,963

10 Claims. (Cl. 252—457)

This invention relates to methods of utilizing, in the production of a purifying medium, especially, but not exclusively, suitable for purifying sugar solutions, fruit juices, vegetable and mineral oils and water, certain waste materials resulting from the manufacture of Portland cement clinker.

While not limited thereto, this invention contemplates the use, for the above-stated purpose, of the waste materials, hereinafter called the combined products, resulting from the manufacture of Portland cement clinker in accordance with the methods described in United States Patents Nos. 1,939,921, 2,006,939, 2,021,623, 2,028,-313, 2,130,574, 2,144,254, 2,161,010, 2,161,011, 2,162,-525, 2,214,716 and 2,214,717.

These so-called combined products include certain mineral components, and have been found, therefore, to constitute an excellent raw materials source for the production of a highly activated defecant and adsorbent capable of efficiently decolorizing and deodorizing, among others, the liquids previously referred to.

In the accompanying specification there shall be described an illustrative embodiment of the methods of the present invention. It is, however, to be clearly understood that the present invention is not to be limited to the exact details herein described for purposes of illustration only inasmuch as changes therein may be made without the exercise of invention and within the spirit and scope of the claims hereto appended.

Referring now more in detail to the aforesaid illustrative embodiment of the methods of the present invention, it has been found in practice that the above referred to combined waste products resulting from the manufacture of Portland cement clinker in accordance with the above set forth United States patents generally have an average chemical composition as follows:

|  | Per cent |
|---|---|
| Silicon dioxide | 40.32 |
| Aluminum oxide | 13.37 |
| Ferric oxide | 1.98 |
| Ferric sulfide | 0.94 |
| Ferrous sulphate | 0.07 |
| Calcium carbonate | 31.65 |
| Magnesium carbonate | 1.37 |
| Magnesium oxide | 2.73 |
| Potassium oxide | 2.36 |
| Sodium oxide | 1.08 |
| Carbon | 2.21 |
| Water and undetermined | 1.92 |
| Total | 100.00 |

It is, of course, to be clearly understood that the present invention is not limited to the use of the combined products of the specific analysis set forth, nor is it limited to the waste products resulting from the manufacture of Portland cement clinker only in accordance with the aforesaid United States patents.

In the above, conventionally recited chemical analysis, the silicon dioxide is found, in pure form, in quartz, and, combined with metals to form complex silicates, in mica, feldspar and talc. The aluminum oxide, ferric oxide, magnesium oxide, potassium oxide, sodium oxide and water are found, forming complex silicates, in the aforesaid mica, feldspar and talc. The carbon is found free as graphite. The calcium carbonate, magnesium carbonate and ferric sulfide are found in the form of calcite, dolomite and iron pyrite.

The approximate mineral composition of the combined products is as follows:

|  | Per cent |
|---|---|
| Calcite | 32.8 |
| Dolomite | 2.0 |
| Iron pyrite | 1.0 |
| Quartz | 12.0 |
| Graphite carbon | 2.2 |
| Mica | 30.0 |
| Feldspar | 14.0 |
| Talc | 6.0 |
| Total | 100.0 |

When the combined products are calcined under appropriate conditions, the carbon is burned, activated metallic oxides are produced, and physical changes take place in the mica, feldspar and talc. These chemical and physical changes result in the production of a material having mild but quite valuable purifying action. The metallic oxide content, however, is not sufficiently high to produce a purifying agent of the high efficiency desired. Hence, it is preferred that, prior to roasting, the combined products be thoroughly mixed with a magnesium compound, such as magnesium hydroxide or magnesium carbonate. The magnesium hydroxide may, for example, be in the mineral form, brucite; the magnesium carbonate may be in the mineral form, magnesite; or the magnesium compounds may be obtained from other mineral sources, or from sea water.

Both the magnesium compound and the combined products should be finely ground before being mixed. When magnesium hydroxide is used, the mixture should be from about a 70-30 to about a 30-70 mixture, preferably, a 50-50 mixture. If magnesium carbonate is used, a larger proportion of the magnesium compound is required in order to produce a final product having the desired magnesium content. In this case, therefore, the mixture should be from about a 75-25 to about a 45-55 mixture, preferably, a 60-40 mixture.

In any event, the mixture is calcined at a temperature of from about 600 to about 800 degrees C. for a length of time of from about 5 to about 30 minutes. The time will depend upon the temperature, the higher the temperature, the shorter the time. While not limited thereto, a temperature of from about 700 to about 750 degrees C. for from about 12 to about 15 minutes has been found to be particularly effective in producing a highly activated purifying medium.

The calcination changes a substantial portion of the minerals in the mixture to oxides, and other portions of the mixture undergo certain physical changes. These physical changes result in a lighter apparent density of the silica compounds of the mixture which improves the filtration rate of the final product. In addition, it appears that some of the inert material of the mixture acts as a carrier or spreading agent for the activated oxides. The calcination should not, however, be permitted to deadburn the mixture, but the ignition losses of the final product should be from about 2% to about 10%, preferably, about 5%.

If desired, the combined products and the magnesium compounds may be calcined separately and subsequently mixed.

It has been found that the uncalcined combined products have a pH of about 9.77 and that an uncalcined, 50-50 mixture of the combined products and the magnesium compound has a pH of about 10.2. After calcination, the mixture should have a pH of from about 11.3 to about 12.4, preferably, about 12.0.

This completes the description of the aforesaid illustrative embodiment of the methods of the present invention. It will be noted from all of the foregoing that by means of the present invention, a hitherto discarded material resulting from the manufacture of Portland cement clinker is advantageously utilized as a raw materials source in the production of a purifying medium, especially, but not exclusively, suitable for use in purifying such liquids as sugar solutions, fruit juices, vegetable and mineral oils and water.

Other objects and advantages of the present invention will readily occur to those skilled in the art to which the same relates.

What is claimed is:

1. The method which comprises: adding a sufficient quantity of an inorganic magnesium compound-containing material to the silica and metallic oxide and salt-containing waste products resulting from the manufacture of Portland cement clinker to obtain from about a 70-30 to about a 30-70 mixture; and thereafter calcining said mixture at a temperature of from about 600 to about 800 degrees C. for from about 5 to about 30 minutes.

2. The method which comprises: adding a sufficient quantity of an inorganic magnesium compound-containing material to the silica and metallic oxide and salt-containing waste products resulting from the manufacture of Portland cement clinker to obtain from about a 70-30 to about a 30-70 mixture; and thereafter calcining said mixture at a temperature and for a length of time sufficient to convert a substantial portion of the mineral components thereof to activated oxide form and increase the porosity of the silica compounds thereof.

3. The method which comprises: adding to the silica and metallic oxide and salt-containing waste products resulting from the manufacture of Portland cement clinker a sufficient quantity of an inorganic magnesium-compound-containing material to obtain from about a 70-30 to about a 30-70 mixture; and thereafter calcining said mixture at such a temperature and for such a length of time as to result in an ignition loss in the final product of from about 2 to about 10% and a pH of from about 11.3 to about 12.4.

4. The method which comprises: adding to the silica and metallic oxide and salt-containing waste products resulting from the manufacture of Portland cement clinker a sufficient quantity of an inorganic magnesium compound-containing material to obtain from about a 70-30 to about a 30-70 mixture; and thereafter calcining said mixture to convert sufficient of the mineral components thereof to activated oxide form to produce a final product having a pH of from about 11.3 to about 12.4.

5. A purifying medium comprising the porous, oxide-containing residue resulting from the calcination of from about a 70-30 to about a 30-70 mixture of a magnesium compound-containing material and the silica and metallic oxide and salt-containing waste products resulting from the manufacture of Portland cement clinker.

6. The method which comprises: preparing from about a 70-30 to about a 30-70 mixture of an inorganic magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; and thereafter calcining said mixture at a temperature of from about 600 to about 800 degrees C. for from about 5 to about 30 minutes.

7. The method which comprises: preparing from about a 70-30 to about a 30-70 mixture of an inorganic magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; and thereafter calcining said mixture at a temperature and for a length of time to produce a final product having a pH of from about 11.3 to about 12.4.

8. The method which comprises: preparing from about a 70-30 to about a 30-70 mixture of an inorganic magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; and thereafter calcining said mixture at a temperature and for a length of time to produce ignition losses in the final product of from about 2 to about 10%.

9. A purifying medium comprising the porous, oxide-containing residue resulting from the calcination at a temperature of from about 600 to about 800 degrees C. for from about 5 to about 30 minutes of from about a 70-30 to about a 30-70 mixture of an inorganic magnesium compound-containing material and the silica and metallic oxide and salt-containing waste products resulting from the manufacture of Portland cement clinker.

10. A purifying medium comprising the porous, oxide-containing residue resulting from the calcination at a temperature of from about 600 to about 800 degrees C. for from about 5 to about 30 minutes of from about a 70–30 to about a 30–70 mixture of an inorganic magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%.

JOHN J. NAUGLE.

REFERENCES CITED

The following references are of record in the file of this patent:

UNITED STATES PATENTS

| Number | Name | Date |
| --- | --- | --- |
| 2,076,545 | Caldwell | Apr. 13, 1937 |
| 2,163,527 | Caldwell | June 20, 1939 |
| 2,305,550 | Nixon et al. | Dec. 15, 1942 |